Nov. 23, 1937. C. PARKER 2,100,148
APPARATUS FOR PRODUCING IMAGES
Filed Oct. 8, 1934 2 Sheets-Sheet 1
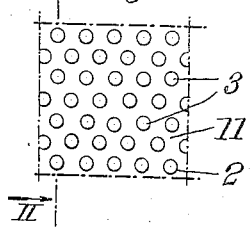
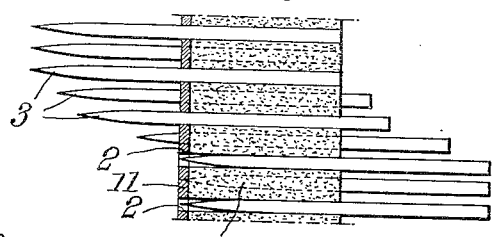
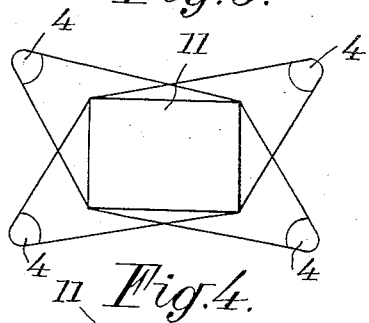
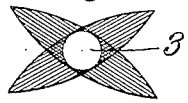
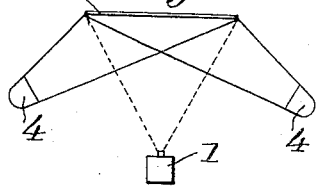
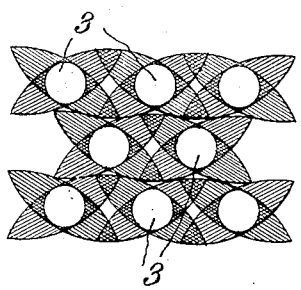
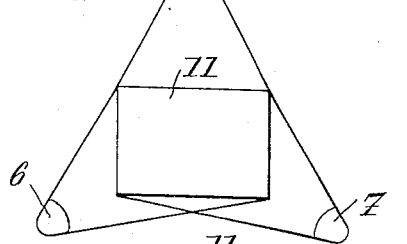
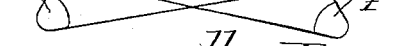
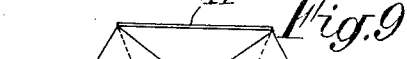
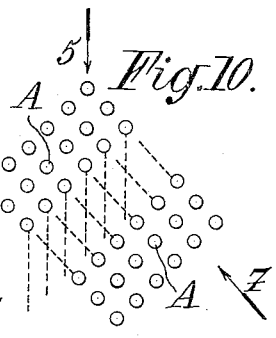
Inventor
CLAIRE PARKER
By Bailey & Larson Nov. 23, 1937. C. PARKER 2,100,148
APPARATUS FOR PRODUCING IMAGES
Filed Oct. 8, 1934 2 Sheets-Sheet 2

Inventor
CLAIRE PARKER
By Bailey & Larson

Patented Nov. 23, 1937

2,100,148

UNITED STATES PATENT OFFICE 2,100,148

APPARATUS FOR PRODUCING IMAGES

Claire Parker, Paris, France

Application October 8, 1934, Serial No. 747,470
In Belgium July 12, 1934

7 Claims. (Cl. 40—28)

The present invention relates to apparatus for producing images, designs, pictures, etc., especially for the obtainment of cinematographic films of the kind called "animated cartoons".

The object of the present invention is to provide an apparatus permitting to obtain new artistic effects while reducing the actual work of producing the images or pictures.

According to the present invention, the apparatus essentially comprises a support carrying a great number of rods which can be caused to project more or less from the surface of said support. It is thus possible to obtain, on said support, by a suitable illumination, shadows of variable characteristics and according to these characteristics or to the nature of the illumination, to obtain infinitely varied tint effects, either in grey and black or in colours.

Other features of the present invention will result from the following detailed description of some embodiments thereof.

Preferred embodiments of the present invention will be hereinafter described, with reference to the accompanying drawings, given merely by way of example, and in which:

Fig. 1 is an elevational view, on a large scale, of a screen for the obtainment of images, according to the invention;

Fig. 2 is a sectional view on the line II—II of Fig. 1;

Figs. 3 and 4 are a front elevational view and a plan view, respectively, showing the screen, on a smaller scale, and the illuminating means, according to a first embodiment of the invention;

Figure 11:
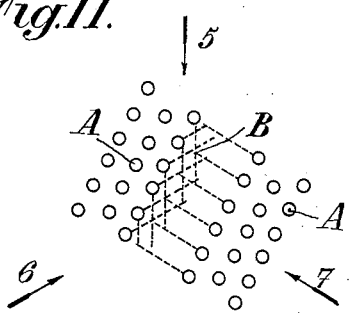
Figure 12:
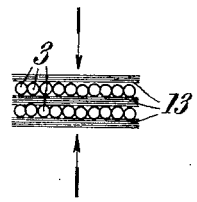
Figure 13:
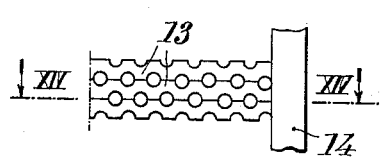
Figure 15:
Figure 14:
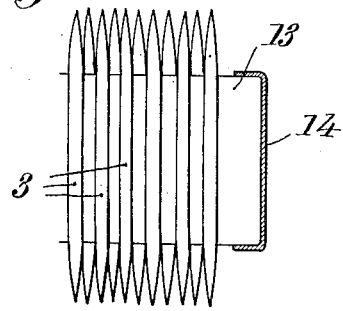
Figure 16:
Figure 17:
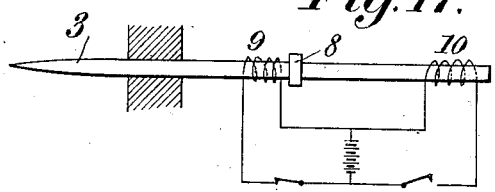
Figure 18:
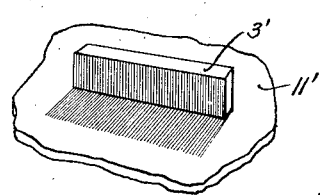

Figs. 5, 6, and 7 are diagrammatical views showing on a scale larger than that of Figs. 1 and 2, the phenomena that are brought into play by the present invention;

Figs. 8 and 9 are views similar to Figs. 3 and 4 showing illuminating means disposed according to another embodiment of the invention;

Figs. 10 and 11 are diagrammatical views, on the same scale as Figs. 1 and 2 illustrating in what manner the screen can be used, according to the present invention for obtaining coloured images;

Figs. 12 and 13 are front views, similar to Fig. 1, showing portions of screens made according to two modifications;

Fig. 14 is a sectional view on the line XIV—XIV of Fig. 13;

Figs. 15 and 16 are diagrammatical views showing two implements to be used for modifying the position of the rods carried by the screens according to the present invention;

Fig. 17 is a diagrammatical view showing a device for electrically controlling the position of said rods;

Fig. 18 is a perspective view of a modification of the device according to the present invention.

According to the invention, the screen, preferably plane, is made of sufficient size (for instance 0.97 meter in width and 1.20 meters in length) for giving images which can be photographed by means of a camera 1 (Fig. 4) disposed in front of said screen. This screen consists essentially of a support $a$ in which are provided, preferably at right angles to its faces, housings 2 in which are slidably fitted rods 3 adapted to be displaced so as to project more or less from the face of said support that is located opposite camera 1, which face is polished and covered with a white coating.

Preferably, rods 3 are provided on the whole of the useful surface of the screen, their number per unit of area being considerable and these rods being distributed uniformly, either in staggered relation (Figs. 1 and 13) or in series of juxtaposed parallel lines (Fig. 12). For instance, the number of rods per square decimeter may be five thousand with rods of a diameter of 0.9 millimeter (Fig. 1), or 15,000 with rods of a diameter of 0.3 millimeter (Figs. 12 and 13).

The maximum value of the distance by which the rods can project from the surface of the screen is determined in such manner that it is possible to obtain, as will be hereinafter explained, a full black shade when the rods are caused to project to the maximum. This distance can easily be determined experimentally in every particular case and it will depend, among other things, on the diameter of the rods and the distance between said rods. Thus, if there are 5,000 rods of a diameter of 0.9 millimeter per square decimeter, the maximum distance by which the rods are caused to project will be 10 millimeters.

The ends of the rods that are visible from camera 1 may be made of any shape, for instance plane, but preferably they are pointed, as it will be supposed in the following description.

The illuminating means consist of at least one lighting apparatus 4 directed obliquely with respect to the direction of rods 3 and at a suitable distance therefrom, for instance four meters, whereby, when this apparatus illuminates the screen, each of the rods produces, on the face of said screen, a shadow the length of which depends on the angle of incidence of the light rays and on the distance by which the rod in question projects from the support, said shadow being reduced to nothing when the rod is wholly engaged into the support.

Preferably, I make use of a plurality of light projectors, so that each rod will produce on the screen as many shadows as there are sources of light. In this case, of course, these shadows, at least for a single rod, are no longer fully black since the shadow made by a projector will be partly attenuated by the light projected by the other sources of light.

Figs. 5 and 6 show the whole of the shadows produced by a single rod illuminated by four projectors, the rod projecting to a greater distance in the case of Fig. 5 than in the case of Fig. 6.

It will be readily understood that when, in a certain portion of the screen, all the rods are caused to project by a well determined amount with respect to the surface of the screen, the shadows produced by the different rods are superposed to one another and some of the elementary zones of the screen will be illuminated by all the projectors, while some other zones will be illuminated only by some of the projectors and other zones will be in complete darkness (Fig. 7).

If now the rods are more deeply engaged into their housings, the elementary zones that are fully or partly illuminated increase in area until the whole of the surface of the screen is illuminated when all the rods are pushed back into their housings.

On the contrary, if the rods are caused to project more from the surface of the screen, the zones that are not illuminated increase in area until complete darkness is obtained for the portion of the screen that is considered.

In view of the very small size of the elementary areas that are considered, the resulting impression produced on the human eye or on a cinematographic film will correspond to a uniform shade ranging from white to black, with all the intermediate intensities of grey, according to distance by which the rods project from the surface of the support.

It is therefore possible, since the whole of the surface of the screen is provided with rods, to adjust the illumination of each point thereof in such manner as to produce, owing to a suitable arrangement of the rods, any desired image, either in black on a white background, or with intermediate grey shades giving an impression of relief.

For practical purposes, in view of the fineness of the system of elements constituted by the rods, it is possible to obtain results analogous to those given by heliogravure or similar printing methods.

Of course, it will be necessary, in order to obtain the best possible results, to suitably arrange the illuminating system that is employed.

It is possible, for instance to make use of four projectors located at the four corners of a rectangle located opposite the screen, the axes of these projectors making, for instance, an angle of 30° with the surface of the screen and an angle of 30° with a horizontal plane (Figs. 3 and 4).

Thus, in the case of the rods being disposed in staggered relation, the shadows of said rods will not be directed along the diagonal lines of rods, but on the contrary in the intervals provided laterally of these lines.

In the preceding description, it has been explained how the invention can be applied for the obtainment of black and white (and gray) images by means of white light.

Of course, an analogous effect would be obtained if use were made of a plurality of projectors giving all light rays of the same colour.

But it is also possible, according to the present invention, to obtain variegated coloured images instead of uniformly coloured images. This result will be obtained as hereinafter explained:

Instead of illuminating the screen by means of projectors giving all the same colour, projectors giving different colours respectively are employed.

In the following explanations, it will be supposed that three projectors 5, 6 and 7 are employed which give red, blue, and yellow rays respectively, but of course any other combination of colours permitting trichromy can be employed. It will be readily understood that it would be possible to make use of only two projectors, or, on the contrary, of a number of projectors greater than three.

These three projectors are disposed, for instance, at the apexes of a triangle, opposite the screen, the axes of these projectors making, for instance, an angle of 30° with the surface of the screen, and the axis of the red projector 5 being in the vertical plane of symmetry of the screen while the axes of the blue and yellow projectors, 6 and 7 respectively, are located in planes making angles of 120° with this plane of symmetry, on either side thereof respectively (Figs. 8 and 9).

It will be readily understood that, with such an illuminating system, when, in a given portion of the screen all the rods are fully depressed into their housings, a white colour resulting from the combination of the three elementary colours is obtained, while, if all the rods project by the same distance from the surface of the screen, a gray or black resulting shade is obtained.

If, on the contrary, in this portion of the screen, the rods are so arranged as to obtain zones A in which the rods project from the surface of the screen and between which are provided zones B in which the ends of the rods are just flush with the face of the screen, all these zones A and B being parallelly disposed and of a suitable width, for instance 1.5 millimeter in the case of rods of a diameter of 0.3 millimeter, it is clear that zones B are illuminated in a manner that will depend, among other things, on the distance by which the rods of zones A project from the surface of the screen, and on the incidence of the light beams from the projectors with respect to the screen.

In Figs. 10 and 11, the directions of the light rays emitted from projectors 5, 6 and 7 are indicated by arrows designated by the corresponding reference numerals.

It is clear that, if zones B are directed in such manner as to run in the same direction as the rays emitted by the blue projector 6 and if the rods located in zones A project to a sufficiently great distance in order that their shadows produced by the two other projectors fully cover zones B, these zones B will be coloured in blue while zones A will be black. This is the case illustrated by Fig. 10.

If, as shown by Fig. 11, the inclination of zones B is the same with respect to the light beams from projectors 5 and 6, a portion of these zones will be illuminated in an equal manner by both of these projectors, while the shadows resulting from the illumination by the third projector will cover the whole of these zones B so that the latter will be coloured in a resultant violet shade.

It will thus be possible, by acting on the direction of zones A and B, on the distance by which the rods project from the surface of the screen, and on the position of the projectors, to obtain, at will, at any point of the screen, an illumination of the desired colour and intensity. This will permit of obtaining coloured images which can be reproduced through any suitable photographic process.

Obviously, the systems above described may be used for obtaining images of any kind and for any purpose whatever, for instance for advertisements or the like.

It would also be possible, after having disposed the different rods of the device in the desired relative positions with respect to the screen, to obtain a reproduction of the system constituted by the rods and the screen through molding or electroplating, which would permit, by suitably illuminating the reproduction thus obtained, to produce optical effects analogous to those obtained by illuminating the original screen.

It is also possible, by photographing the system of screen and rods made as above explained, to obtain networks capable of being used in printing methods, for instance for photogravure.

I may also provide, according to the present invention, an automatic control of the position of the various rods, by a television or any other equivalent apparatus.

An example of such an application of the invention is shown in Fig. 17. In this embodiment each rod is prolonged so as to carry a magnetic mass 8 capable of being attracted in one direction or the opposite one by two electro-magnets 9 and 10 which will be fed with current at the proper time.

In the preceding description, no information has been given concerning the matter of which the screen is made. Said screen may be made in many different ways, for instance by making holes in a plate of suitable thickness, or by molding of a melted material or of a powdery material which is agglomerated by pressure, in a mould including as many small cores (corresponding to the rods) as there must be holes in the screen.

It is also possible, as shown by Fig. 2, to constitute the screen of a metal sheet 11 of 0.5 mm. thickness, suitably perforated and on the back side of which is applied a layer, of a thickness ranging between 10 and 12 millimeters for instance, of a product, such as paraffin, capable of guiding rods 3 with a certain friction.

The screen may also be made, as shown by Figs. 12 to 14, by superposing bands 13, for instance of aluminium, between which rods 3 will be placed.

In this case, said bands may be made with plane surfaces, and the rods will then be advantageously juxtaposed to one another between two successive bands. Or the bands may be provided with notches adapted to receive the rods once these bands have been assembled together (Fig. 13).

In any case, these bands 13 shall advantageously be piled up in a vertical frame 14 and held in position through any suitable means, in such manner that the rods, while being maintained, can be displaced when desired. Besides, they might be coated with a suitable body, for instance vaseline, so as to obtain the desired degree of friction.

With this arrangement, it will be possible to easily obtain a screen the respective faces of which are exactly parallel to each other.

Whatever be the manner in which the screen is made, the rods will advantageously be given a length such that when they project to the maximum degree on one side of the frame, their opposite ends are flush with the other side of said screen (Fig. 2).

With this arrangement, when the respective faces of the screen are exactly parallel to each other, the image obtained on the back side of the screen will be the negative, in the photographic meaning of the word, of the image made on the front face of said screen.

This effect will be particularly clear if both ends of the rods are pointed in exactly the same manner (Fig. 14).

Anyway, for the manual displacement of said rods, it is possible to provide a set of suitable tools, including for instance spatulas of various sizes, cylindrical rollers (Fig. 15) permitting to push in a single stroke a great number of rods in one direction or the opposite one, or ribbed rollers (Fig. 16) adapted to produce zones A and B as above referred to, for the obtainment of coloured images.

It will be readily understood that the system above described is particularly advantageous for the production of cinematographic films of the kind called "animated cartoons" since it suffices, in order to pass from one picture of the film to the next picture, to displace in a suitable manner some of the rods of the system instead of being compelled, as in the existing system of sketches made by hand, to draw a new sketch for each picture.

Furthermore, in the case of a mistake, correction is particularly easy with the system according to the present invention since it suffices to rub out the picture that has been made on the screen by passing, over either of the faces thereof, a cylindrical roller.

Of course the invention also includes the case in which a whole row of rods would be movable as a unit and even would be replaced by a continuous partition (Fig. 18) which would for instance permit of obtaining black on white images of print characters. For example, Fig. 18 shows a partition 3' projecting from, and casting a shadow upon, the screen 11'.

In a general manner, it should be well understood that, while I have described what I deem to be practical and efficient embodiments of the present invention, I do not wish to be limited thereto as there might be changes made in the arrangement, disposition and form of the parts without departing from the principle of the present invention as comprehended within the scope of the appended claims.

What I claim is:

1. A device for the production of images which comprises, in combination, a screen provided with a plurality of openings distributed over its surface, said openings extending transversely to said surface and being spaced from each other to leave substantial screen surfaces therebetween, means for projecting onto said screen oblique light rays, and a plurality of elongated elements slidable in said openings so as to project more or less from said surface and to produce shadows on said surfaces between said openings, said shadows being of variable size and shape according to the respective position of said elements with respect to said surface.

2. A device as in claim 1, said openings being disposed in aligned rows.

3. A device according to claim 1 in which said screen consists of a perforated sheet of metal in combination with a layer of matter capable of guiding the rods with a certain friction.

4. A device according to claim 1 in which said screen includes a plurality of metal bands piled up on one another, and means for keeping said bands assembled together.

5. A device according to claim 1 in which said rods have elongated pointed ends which form only a small angle in cross-section.

6. A device for the production of images which comprises, in combination, a screen provided with a plurality of openings distributed over its surface, said openings being spaced from each other so as to leave substantial plane surface areas therebetween, at least two projectors having their respective axes disposed obliquely to said surface of said screen, said projectors emitting light rays of different colors respectively onto said surface, and a plurality of elements slidable in said openings respectively so as to project more or less from said surface of said screen to produce on said plane areas shadows of variable size, shape and color according to the respective position of said elements with respect to said surface of the screen.

7. A device for the production of images which comprises, in combination, a screen provided with a plurality of openings distributed over its surface, said openings extending transversely to said surface and being spaced from each other to leave substantial screen surfaces therebetween, at least two projectors projecting oblique light rays onto said screen, said projectors having their respective axes disposed obliquely to the surface of said screen, and a plurality of elongated elements slidable in said openings so as to project more or less from said surface and to produce shadows on said surface, said shadows being of variable size, shape, and intensity according to the position of said elements and said projectors with respect to said surface.

CLAIRE PARKER.